(No Model.)
C. FAHRNEY.
ROAD CART.
No. 454,859. Patented June 30, 1891.
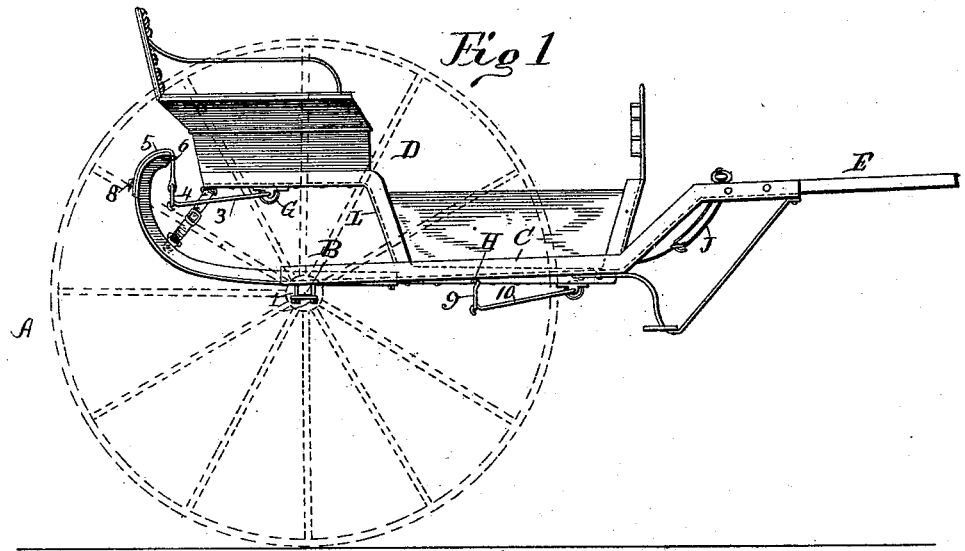
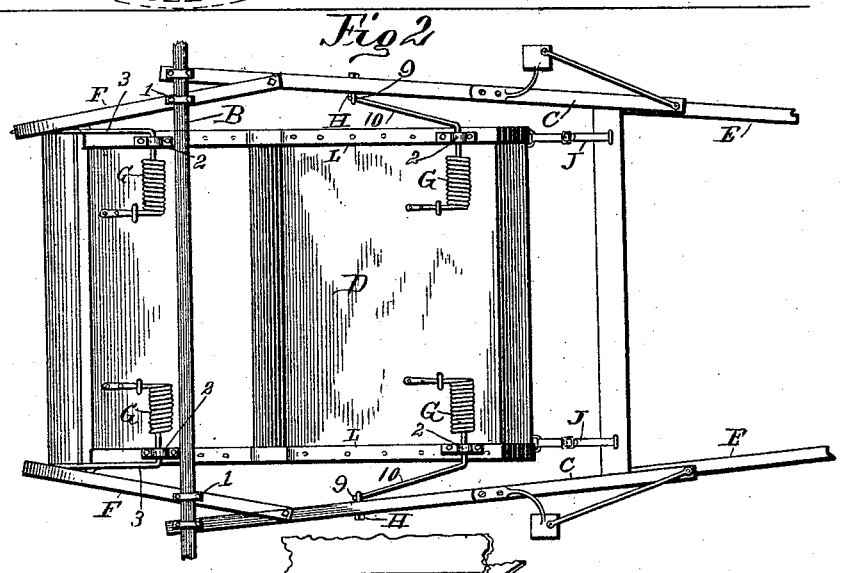
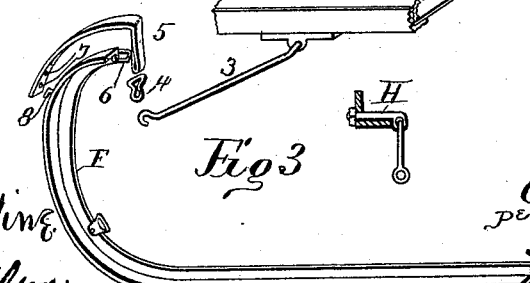
Witnesses
C. C. Burding
H. P. Wilson
Inventor
Callo Fahrney
per
J. G. Manahan.
his Attorney

UNITED STATES PATENT OFFICE.

CALLO FAHRNEY, OF POLO, ILLINOIS.

ROAD-CART.

SPECIFICATION forming part of Letters Patent No. 454,859, dated June 30, 1891.

Application filed March 20, 1891. Serial No. 385,786. (No model.)

*To all whom it may concern:*

Be it known that I, CALLO FAHRNEY, a citizen of the United States, residing at Polo, in the county of Ogle and State of Illinois, have invented certain new and useful Improvements in Road-Carts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in road-carts in which the body of the cart is suspended by and upon four springs distributed about equally at its several corners and so located in relation to the axle as that the load is carried directly over the latter, and the load or weight is supported equally by each of the four springs.

The objects of my improvements are to utilize angle-steel as the side frame of the vehicle, bent to conform to the requisite shape and adapted to receive the rear end of the thills abbreviated at their rear ends just forward of the usual bend in such thills, so that the bends aforesaid can be dispensed with and the thills be simply and cheaply formed and economically replaced in case of breakage; second, to dispense with the usual connection of the body of the vehicle to the cross-bar at the rear of the thills and to permit a free action of the body of the vehicle both in front and in the rear of the axle; third, to utilize the rear ends of the aforesaid frame to suspend the rear springs; fourth, to locate the attached end of the front springs so near the axle as to minimize the vertical oscillation or horse motion of the thills; fifth, to afford flexible connection to all of the springs of the frame and preclude the oscillation or jar of the axle from being communicated to the body of the vehicle. I attain these objects by the mechanism illustrated in the accompanying drawings, in which—

Figure 1 is a side elevation of a vehicle embodying my invention. Fig. 2 is a view of the bottom thereof. Fig. 3 is a detail of certain of the parts involved in supporting the body.

Similar letters refer to similar parts throughout the several views.

A A are the usual carrying-wheels which support the axle B.

C C are longitudinal side plates made of angle-steel, constituting the front portion of the side frame aforesaid and supported at their rear ends upon the axle B, respectively, a slight distance within the carrying-wheels and extend horizontally forward to about the front end of the body D of the vehicle, and are there bent upward and projected forward horizontally at the proper altitude to receive the rear ends of the thills E.

The rear ends of the plates C are clipped through their horizontal portions to the axle B in the usual way, and the thills E are attached to the front ends of the plates C, respectively, by being placed in the angle of the latter and fastened therein by transverse bolts *l*. This connection brings the bottoms and sides of the thills E for some distance in contact with the inner faces of the plates C and constitutes a very rigid connection, and, as the plate C furnishes the usual bow required, the thills E may consist simply of a straight portion, much shorter than that ordinarily employed, keep their shape better, and are easily replaced in case of breakage.

F F are arms constituting the rear part of said side frame and have an intermediate bearing on the axle B, and are attached at their front ends in advance of said axle to the side plates C, respectively.

The arms F F mutually converge at their rear ends, as shown in Fig. 2, and thus afford convenient passage to and from the body D from the rear and also serve as lateral braces.

The body of the vehicle is supported upon four springs G, located near its several corners. The springs G are intermediately coiled and have their inner ends suitably clipped and riveted to the bottom of the body D, as shown in Fig. 2. The transverse portion of the springs G outside of the coiled section thereof is held in a sleeve 2, attached to the bottom of the body D, and the outer and rearwardly extending end of the rear springs G is suitably provided with a hook 3, adapted to engage the loop 4 on the end of the strap 5. The opposite end of the strap 5 is passed upward through the loop 6, formed on the end of the arm F, and is provided with holes 7, either of which may be optionally passed down over a hook 8, formed on the exterior of the arm F, whereby said strap 5 is adjustably suspended. By means of the holes 7 in strap 5 the rear end of the body D may be raised or lowered to accommodate the position of the seat to the height of the animal employed. The flexibility of the straps 5 and the articulation of the hook 3 in the loop 4 of said strap permit the body D at its rear end to hang undisturbed by any oscillation or jerking movement of the rear ends of arms F.

To the side plates C, a slight distance in front of the axle B, is rigidly attached a transverse eyebolt H, having its eye on the inner side of the plate C. To the hook H is suspended the link 9, in which is supported the hook 10 of the rear end of the front springs G to permit a freedom of oscillation in every direction of the link 9, which effectually prevents the jar of the bearing portion of the vehicle from being communicated to the body thereof.

It will be observed that the attachment of the front springs G G to the side plates C is but a short distance in advance of the axle B and that the body D has no connection forward of that point, except the loose straps J J, which loosely connect the front of the body D to the cross-bar K simply to assist to suspend the front of the body D in stepping therein from the front and prevent the strain to the front springs from a heavy load in the front portion of said body; but said straps J in the normal use of the body D have no operation. The latter is therefore borne equally on the four springs G and has its elasticity in a vertical plane like that of an ordinary four-wheeled buggy.

The sills L of the body D are also of angle-steel, extending from the rear to the front of said body along each of its lower edges, having the central bend L to enable said sills to support the seat portion of said body at their rear ends and the foot rest or box of said body at their front ends. The wooden portion of the body D is attached to the sills L by resting in and being bolted to the under face of the horizontal portion of the sills L, and the sides of said body bolted to the inner face of the vertical portion of said sills. In this construction the sills L of themselves form the outer angles of the body D, and being solid and integral preclude any of the usual objectionable openings of such angles caused by the swelling and contraction of the wood from exposure to moisture.

What I claim as my invention, and desire to secure by Letters Patent of the United States, is—

1. In a road-cart, the combination of the axle B, suitably supported upon carrying-wheels, the side plates C, projected forwardly from said axle and supported thereby at their rear ends, the arms F, convergently projected rearwardly from said axle and supported thereby, the four springs G G, flexibly supported by arms F and plates C, and the body D, seated at or near its four corners upon said springs, substantially as shown, and for the purpose described.

2. In a road-cart, the combination of the axle B, suitably supported upon carrying-wheels, longitudinal side plates C, supported at their rear ends upon said axle and adapted at their forward ends to receive the thills E, rearwardly-convergent arms F, attached at their front extremities to the side plates C and supported intermediately by the axle B, thills E, front springs G, flexibly connected to the side plates C a short distance in front of axle B and projected forward therefrom, rear springs G, flexibly connected at their outer ends to the rear end of the arms F and projected forwardly therefrom, and the body D, rigidly seated upon the inner ends of said springs, substantially as shown, and for the purpose specified.

3. In a road-cart, the combination of the body D, provided with bent metallic angular sills L and suitably supported upon the front springs G G rearwardly, the converging arms F, suitably supported at their forward ends and provided with loops 6 and hook 8, strap 5, provided with loop 4 and holes 7, and rear springs G G, provided with hook 3, adapted to engage loop 4, whereby the rear of body D is adjusted vertically, substantially as shown, and for the purpose specified.

In testimony whereof I affix my signature in presence of two witnesses.

CALLO FAHRNEY.

Witnesses:
JOHN H. SMITH,
CORNELIUS E. SMITH.